United States Patent Office 2,776,905
Patented Jan. 8, 1957

2,776,905

STABILIZED ROSIN SIZE AND A METHOD OF STABILIZING THE SAME

Gerald I. Keim, Oxford, Pa., assignor to Hercules Powder Company, Wilmington, Del., a corporation of Delaware No Drawing. Application August 21, 1953,
Serial No. 375,828

4 Claims. (Cl. 106—238)

This invention relates to paste rosin sizes stabilized against crystallization and to methods of preparing the same.

Ever since Wurster in 1878 concluded that the prime sizing agent was free rosin thrown down by the alum, much stress has been laid on the use of sizes high in free rosin, i. e., having a high acid number. Also, low free rosin paste sizes are usually badly gelled and have high viscosities. Such sizes are very difficult to unload from tank cars or pump from storage. Increasing the free rosin content reduces gel and viscosity. Furthermore, to reduce freight costs and facilitate storage it is desirable to prepare the paste rosin size with as high a solids content as possible. Thus, the paste rosin size most desired by the art must have (1) a high free rosin content (as evidenced by acid number) and (2) a high solids content. Unfortunately paste rosin sizes meeting these requirements are subject to extensive crystallization during storage. This crystallization is extremely troublesome causing serious loss of size and plugging of pipe lines when transferring size from drums or tank cars to storage tanks and when removing the size from the storage tanks for use.

The crystals formed in high free rosin paste sizes consist of a double salt of abietic acid and sodium abietate. In paste rosin sizes of high solids content, i. e., 70% or higher, the crystals consist almost entirely of a 1:1 mixture of abietic acid and sodium abietate, called 1:1 salt. As the solids content is lowered below 70% the crystals contain an appreciable amount of 3:1 salt (three moles of abietic acid for one mole of sodium abietate), although even at such low solids content the crystals most commonly found are 1:1 salt.

The prior art discovered that condensation products of formaldehyde with various amines, such as aniline, diethanolamine, morpholine, etc., were active in preventing crystallization of 3:1 salt. Such condensation products, however, are relatively ineffective to prevent crystallization of 1:1 salt, particularly at high solids content, i. e., above 70%. Moreover, even at lower solids contents, i. e., 70% and below, these condensation products are relatively ineffective for preventing crystallization of either 3:1 or 1:1 salt in the presence of seed crystals. Most commercial equipment used for transportation and storage of paste rosin size will contain such seed crystals.

It has now been discovered that crystallization is strikingly inhibited in paste rosin sizes by the inclusion therein of a stabilizing amount of the condensate obtained by reacting a material selected from the group consisting of rosin acids, esters of rosin acids, alcohols produced by the reduction of the carboxyl groups of a rosin acid and esters of said alcohols, containing two ethylenic double bonds in the rosin nucleus with a monoether, monoester or ether-ester of a gem-diol or with a gem-diether or gem-diester wherein the oxygen atoms are attached to acyclic carbon atoms. Particularly preferred is the reaction product of a rosin acid with dimethoxymethane. These condensates together with a novel process for producing them are fully set forth in the copending application of Alfred L. Rummelsburg, Serial No. 264,241, filed December 29, 1951, now U. S. Patent No. 2,720,513. The compounds which have been found useful to inhibit crystallization in paste rosin sizes in accordance with this invention are limited to those condensates described in the aforesaid patent of Alfred L. Rummelsburg. The compounds which are reacted with a rosin acid or rosin acid derivative have the general formula

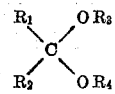

wherein $R_1$ and $R_2$ are hydrogen, alkyl, aryl, aralkyl or alkaryl radicals and may be the same or different. $R_3$ is an alkyl, aralkyl or acyl group, and $R_4$ is hydrogen, alkyl, aralkyl, or acyl. Representative compounds which may be used in accordance with this invention are: formals such as dimethoxymethane, dibutoxymethane, acetals such as 1,1-dimethoxyethane, propionals, butyrals, hemiformals such as methyl hemiformal, hemiacetals, ether-esters of gem-diols such as 1-methoxy-1-acetoethane, gem-diesters such as ethylidene diacetate, allylidene diacetate, etc. The condensates described by Rummelsburg are operable in the process of the instant invention whether the condensates are produced by the novel process of Rummelsburg or by some alternative process.

By stabilizing amount is meant a relatively small amount sufficient to prevent excessive crystallization in the paste rosin size during its storage under ordinary commercial conditions. Ordinarily, I find that from about 1% to about 10% of condensate, based on the weight of the rosin, is sufficient as a crystallization inhibitor when the condensate contains about one mole of rosin or rosin derivative to about one mole of the monoether, monoester or ether-ester of a gem-diol or with a gem-diether or gem-diester wherein the oxygen atoms are attached to acyclic carbon atoms. My preferred range is from 1% to 5%. It is evident that more than one mole of rosin may be used to give a crystallization inhibitor containing progressively smaller amounts of condensate. In this case, a correspondingly larger amount of the inhibitor is needed to keep the concentration of condensate within the desired range. If desired, one may even react a sufficient amount of the monoether, etc., to form exactly the desired stabilizing amount of condensate in situ in the rosin.

The following examples are presented in illustration but not in limitation of the invention. All parts and percentages are by weight unless otherwise specified.

All of the paste rosin sizes evaluated in the following examples were prepared as follows: The rosin furnish or fortified rosin furnish was melted under a nitrogen blanket and heated to 160° C. In those examples wherein a crystallization inhibitor was used, the inhibitor was blended with the rosin furnish at this point. To the molten rosin was then added a hot soda ash solution containing the calculated quantity of soda ash to neutralize the desired percentage of the rosin furnish. The degree of saponification is indicated in the particular examples by setting forth the acid numbers of the resulting sizes. The mix was then stirred mechanically and heated until the reaction was essentially completed. Then the solids were adjusted to give a total solids of about 80%. The paste rosin sizes were then seeded with crystals of 1:1 salt and stored in an oven at 60° C. The samples were tested every two or three days to observe crystal formation. The reaction product of rosin and dimethoxymethane used in the examples was prepared as set forth in Example 1 of the above-mentioned application of Alfred L. Rummelsburg.

EXAMPLES 1 AND 2

The reaction product of rosin and dimethoxymethane was evaluated in these examples as a crystallization inhibitor in a very high free rosin size. The results are set forth in the following table:

*Table I*

| Example | Percent Crystallization Inhibitor Based on Rosin | Acid Number of the Size | Days Stored at 60° C. | Amount of Crystallization |
|---|---|---|---|---|
| 1 | 0 | 52 | 4 | Very heavily crystallized. |
| 2 | 10 | 52 | 60 | Very few crystals. |

EXAMPLES 3-9

The fortified rosin furnishes evaluated in these examples were prepared by reacting 3.25 parts of maleic anhydride with 100 parts of gum rosin for 30 minutes at 160° C. The crystallization inhibitor used in these examples was the reaction product of rosin and dimethoxymethane. The acid number of the various sizes is varied to show the effect of this property on the crystallization behavior of the size. The following results were obtained.

*Table II*

| Example | Percent Crystallization Inhibitor Based on Rosin | Acid Number of the Size | Days Stored at 60° C. | Amount of Crystallization |
|---|---|---|---|---|
| 3 | 3 | 26.5 | 41 | No crystals. |
| 4 | 5 | 27.3 | 41 | Do. |
| 5 | 0 | 31.0 | 41 | Numerous crystals. |
| 6 | 5 | 35.0 | 41 | Very few crystals. |
| 7 | 0 | 36.2 | 41 | Very badly crystallized. |
| 8 | 5 | 43.0 | 41 | Moderate amount of crystals. |
| 9 | 0 | 43.5 | 41 | Crystallized solid. |

From these examples it can clearly be seen that the quantity of crystallization inhibitor required depends heavily on the free acidity of the size. The examples show that the crystallization inhibitors of the instant invention are effective to inhibit crystallization in paste rosin sizes having as high a total solids as 80% even when the paste rosin size has been seeded with 1:1 salt.

The term "paste rosin sizes" as used herein refers, of course, to paste sizes made from either wood rosin or gum rosin.

I claim:

1. A method of stabilizing paste rosin sizes against crystallization which comprises incorporating therein stabilizing amounts of a crystallization inhibitor comprising the product obtained by reacting a material selected from the group consisting of rosin acids, esters of rosin acids, alcohols produced by the reduction of the carboxyl group of a rosin acid and esters of said alcohols, containing two ethylenic double bonds in the rosin nucleus with a compound of the group consisting of monoethers, monoesters and ether-esters of gem-diols; and gem-diethers and gem-diesters wherein the ether and ester oxygen atoms are attached to acyclic carbon atoms.

2. A method of stabilizing paste rosin sizes against crystallization which comprises incorporating therein stabilizing amounts of a crystallization inhibitor comprising the reaction product of a rosin acid and dimethoxymethane.

3. A paste rosin size composition stabilized against crystallization by the incorporation therein of stabilizing amounts of a crystallization inhibitor comprising the reaction product of a compound selected from the group consisting of rosin acids, esters of rosin acids, alcohols produced by the reduction of the carboxyl group of a rosin acid and esters of said alcohols, containing two ethylenic double bonds in the rosin nucleus with a compound of the group consisting of monoethers, monoesters and ether-esters of gem-diols; and gem-diethers and gem-diesters wherein the ether and ester oxygen atoms are attached to acyclic carbon atoms.

4. A paste rosin size composition stabilized against crystallization by the incorporation therein of a stabilizing amount of a crystallization inhibitor comprising the reaction product of a rosin acid and dimethoxymethane.

References Cited in the file of this patent

UNITED STATES PATENTS

| 2,294,726 | Dreshfield | Sept. 1, 1942 |
| 2,362,973 | Cassaday | Nov. 21, 1944 |
| 2,438,096 | Poor et al. | Mar. 16, 1948 |
| 2,684,300 | Wilson et al. | July 20, 1954 |